United States Patent [19]

Warthan et al.

[11] 4,396,902
[45] Aug. 2, 1983

[54] OCR/VARIABLE HEAD SLOT READER

[75] Inventors: Jerry G. Warthan, Plano; Robert M. McMillan, Carrollton, both of Tex.

[73] Assignee: Recognition Equipment Incorporated, Irving, Tex.

[21] Appl. No.: 165,992

[22] Filed: Jul. 7, 1980

[51] Int. Cl.³ ............................................. G06K 7/015
[52] U.S. Cl. ...................................... 382/64; 235/440; 235/449; 235/454; 235/485; 235/7; 235/65
[58] Field of Search ................. 340/146.3 C, 146.3 Z, 340/146.3 D, 146.3 AH, 146.3 ED; 235/440, 449, 454, 483, 484, 485

[56] References Cited

U.S. PATENT DOCUMENTS

| 3,578,953 | 5/1971 | Milford et al. | 340/146.3 Z |
| 3,764,978 | 10/1973 | Tyburski et al. | 340/146.3 D |
| 3,780,264 | 12/1973 | Kondur, Jr. et al. | 235/485 |
| 3,938,089 | 2/1976 | McGregor et al. | 340/146.3 C |
| 3,939,327 | 2/1976 | Humphrey | 235/454 |
| 3,949,363 | 4/1976 | Holm | 235/449 |
| 4,013,894 | 3/1977 | Foote et al. | 235/440 |
| 4,107,653 | 8/1978 | Kruklitis | 340/146.3 C |
| 4,137,449 | 1/1979 | Townsend et al. | 235/449 |
| 4,201,978 | 5/1980 | Nally | 340/146.3 D |
| 4,205,780 | 6/1980 | Burns et al. | 235/449 |

Primary Examiner—Leo H. Boudreau
Attorney, Agent, or Firm—John E. Vandigriff

[57] ABSTRACT

A reading device which uses both optical character recognition techniques and magnetic reading are combined in a reader wherein the magnetic reading head stays at a fixed position while the optical reading aperture may be varied to accomodate different documents. The slot through which checks, credit cards or other similar documents are passed is movable vertically to adapt to different media from which information is to be read.

6 Claims, 9 Drawing Figures

OCR/VARIABLE HEAD SLOT READER

FIELD OF INVENTION

This invention relates to reading devices, and more particularly to optical character reading and magnetic reading devices in a common system in which magnetic credit cards and other documents such as checks may be read, providing both reading capabilities within one system.

PRIOR ART

Present optical character reading systems provide either hand-held or fixed position readers. Hand-held readers as described in U.S. Pat. No. 4,075,605, are used to read sales tickets, tags and various other items having OCR readable print thereon. In these systems the hand-held reader is moved adjacent the surface of the printed material to optically lift information therefrom.

Magnetic readers for reading credit cards are also utilized wherein the credit card may be deposited in a slot and read to dispense cash, or record information therefrom. Even though many of the plastic credit cards have magnetic a stripe with information recorded thereon, a mechanical imprint machine is used to lift the printed material from the card when charge sales are made.

BRIEF SUMMARY OF THE INVENTION

The system described herein is a unique system utilizing optical character reading technology to provide OCR character reading capabilities simultaneously with magnetic stripe reading to provide a dual function to the data-entry system. The system is capable of inputing information regarding credit, financial or other information to a host computer. One unique feature of the system is the variable center line of the Optical Reader. The path of the document is adjusted with respect to the Optical reader so that various portions of document may be optically read. The optical read center line is varied but the magnetic read-head remains constant with respect to the document track. This is necessary because a standard for magnetic reader stripes on plastic credit cards has been established so that the magnetic stripe for all cards is a defined distance from the bottom of the card. Therefore within the system the magnetic data can be read regardless of the setting of the position for the optical reader. This system solves a problem of multiple reading devices for both human readable and magnetic characters which must be encoded and entered into a data-base. While the system described herein only illustrates a hand-fed system, it is possible to install a capstan and belt system for moving documents past the two read heads to increase the data throughput.

A brief description of the drawings.

Figure 1:
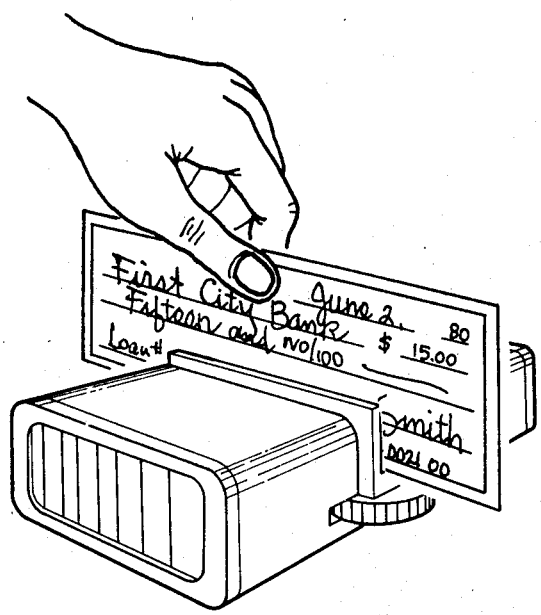
FIG. 1 is a pictorial view of the system of the present invention.

Referring to FIG. 1, there is illustrated a pictorial diagram of a reader of the present system. Illustrated is a document which is being read by the system. Checks and similar documents may have magnetic printing thereon which can be either magnetically or optically read. In such a system, as illustrated, a check may be fed to the system wherein the bank identification code and account number of the person issuing the check may be read. Such a system may be at a teller station, wherein the amount of the check is keyed in by the teller. The keyed information as well as the optically or magnetic read information is fed into a computer recording the transaction of cashing or depositing checks.

Once the information is in the system, thereafter it can be handled by a central computer balancing an active account and issuing statements at the end of the month.

Similarly, such a device may be used in a retail environment, wherein a credit card is fed to the system and the account number is magnetically read from the card. The cashier can then key in the amount of the sale wherein the customer account and the sale amount is entered into the computer for later billing.

Figure 2:
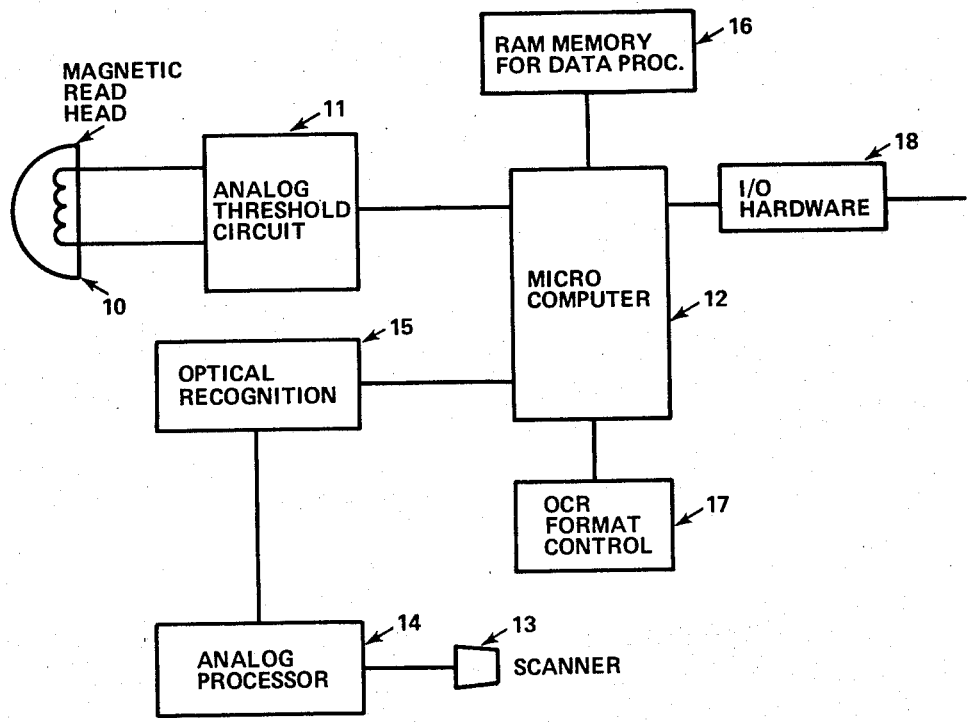
FIG. 2 is a functional block diagram of the invention.

In FIG. 2 a magnetic reading head 10 is connected to the system through an analog threshold circuit 11. The analog threshold circuit is made up of a low level signal processing circuit which amplifies the signal from the magnetic reading head to a sufficient level for thresholding the phase encoded data. The entire circuit assembly may be discrete components or manufactured in a custom medium scale integrated circuit. The output of the threshold circuits a series of digital pulses which represent the magnetically encoded data. This data is relayed to the computer 12 and is stored in the RAM 16 for interpretation via logic and program information contained within the computer 12. The analog threshold circuit amplifies the signal generated by the magnetic head and relays it to the computer 12 which is programmed to accept the information and to read the information content thereof.

The optical scanner 13 feeds an analog processor 14 with electrical signals from an electronic array in the scanner 13, and relays them to the optical recognition system 15. Such a system might be similar to that disclosed in U.S. Pat. No. 4,075,605. The optical processed data is transferred to computer 12. The optical processed data are interpreted via logic and control information contained within the computer 12. This interpreted process is assisted by special data contained within the OCR Format Control 17. Since the optical read data has to be in specially readable fonts the OCR Format Control recognizes particular fonts and the format of the data and assists the computer in the analyzing of the optical data. The input-output 18 of the computer can be fed to equipment such as a host computer which may store the data for further processing, a CRT for displaying the read data and/or a printer for printing the read data.

Special coding of data information is used to identify which technique caused the data to be entered into the system. Interactive control by the host system can also provide structured use of the optical and magnetic read portions of the invention. Additionally useful information may be fed back to the opertor via this path.

Looking in more detail at the structure of the invention, the optical portion of the system consists of an optical frame 31, a reflector 32 and a lens tube assembly 33, packaged in a manner to allow electronic component to become an integral part of the optics assembly.

Figure 3:
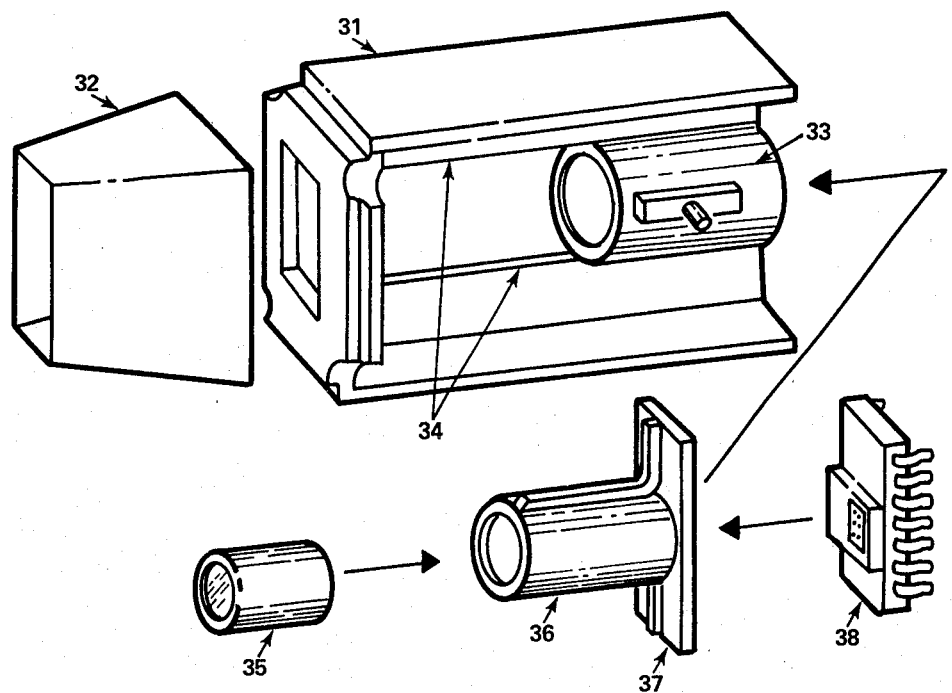
FIG. 3 is an exploded view of a lens assembly used in the present invention.
Figure 4:
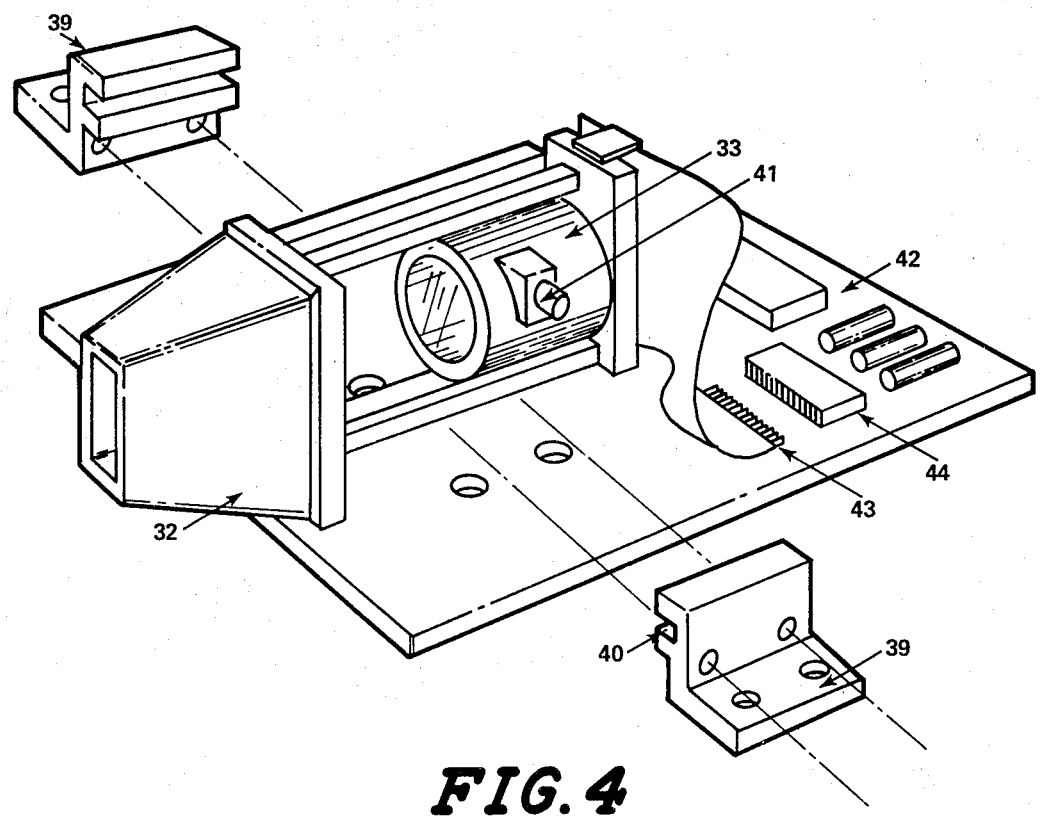
FIG. 4 is a partially assembled view of the lens and scan system of the present invention.

Referring to FIG. 3, the optical frame 31 has a nose reflector 32 mounted to the frame. The reflector is used to direct the image of the document into the system and to keep out extraneous light. The nose reflector also includes the illumination source (not illustrated) which illuminates the document from which the data is to be read. The optics frame forms a back wall of the reflector and also is a lens tube assembly carrier. The frame also provides mounting features to mount a circuit assembly. The entire optics assembly mounts onto the circuit board as illustrated in FIG. 4. The optics frame is designed such that no direct external load is applied to the frame or reflector to cause misalignment and warpage. The optics frame accepts the lens tube assembly and positions all the optical components on a common structure to insure proper alignment.

The lens tube 36 is a plastic part that provides the lens mounting and focusing adjustment and also provides for the mounting of the electronics array 38.

Looking at FIG. 3, the lens 35 is inserted into the lens tube 36. The electronic array 38 is mounted on the flat surface at one end of the lens tube. This assembly is inserted within the tube 33 on the optics frame 31. The tube may be adjusted on the tracks 34 so that the correct magnification is obtained. After the lens assembly is properly positioned, the brackets 39 are positioned at each side of the tube with the pin 41 fitting within the slot 40 of the brackets to secure the lens assembly in place. The electronic array 38 is then interconnected with the circuit board 42 through the flexible circuit 43.

Figure 5:
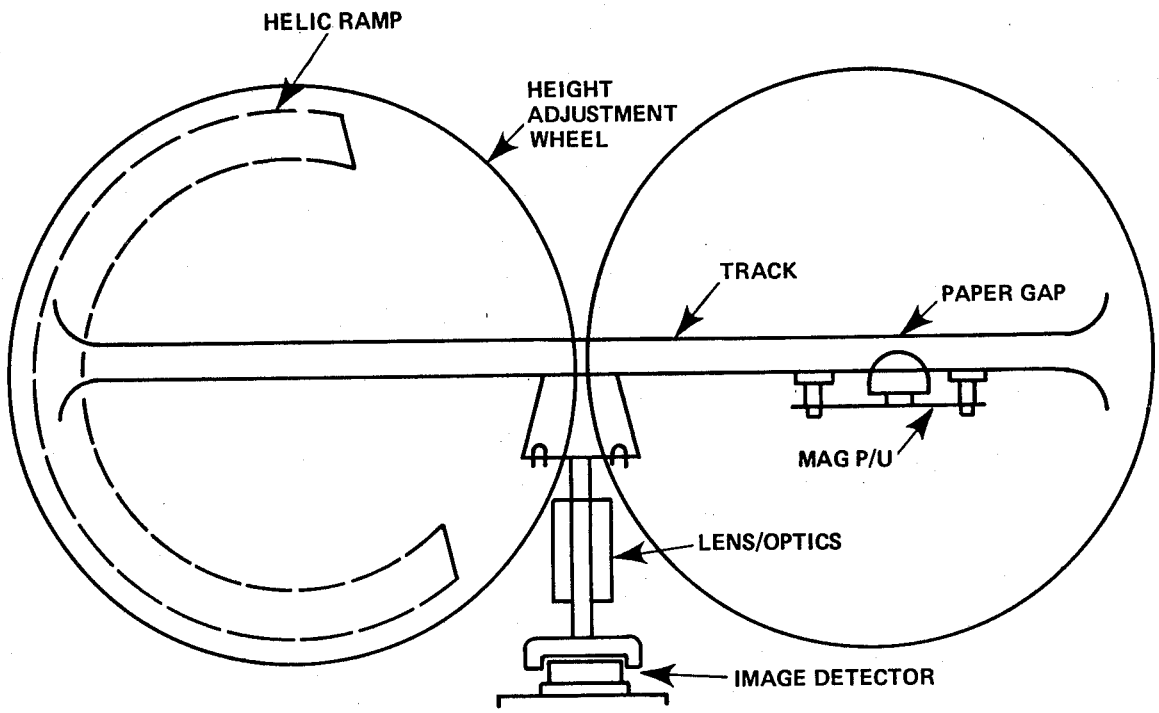
FIG. 5 illustrates the document slot, readers and adjustment mechanism of the system shown in FIG. 1.
Figure 6:
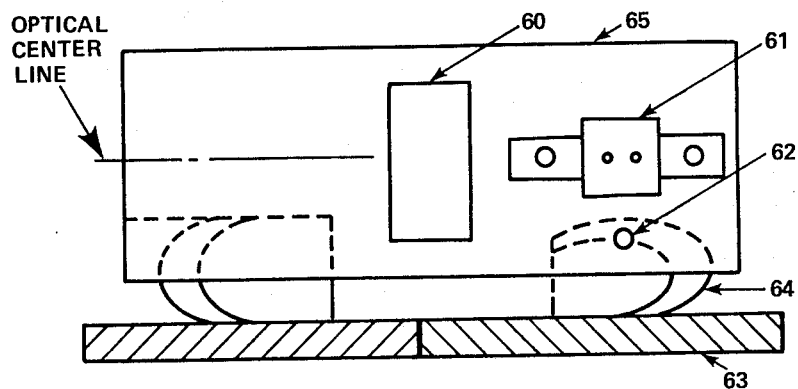
FIG. 6 is a front view of the mechanism in FIG. 5.

FIG. 5 illustrates the relative positions of the magnetic and optical pickups in regard to the document track. The document track 65 has an opening 60 therein (FIG. 6) through which the optical reading is accomplished. The magnetic pick up unit 61 is attached to the track 65 in a fixed position. The entire track can be raised or lowered using the adjustment wheels 63 and the helical ramps 64. The two adjustment wheels engage each other so that the raising and lowering may be accomplished by turning either wheel. As the wheels turn the track rides up and down depending upon the direction the track moves on the ramps. The optical center line is adjusted however, since the magnetic pickup is attached to the track, the relative position to the pickup and the bottom of the track is held constant.

Figure 7:
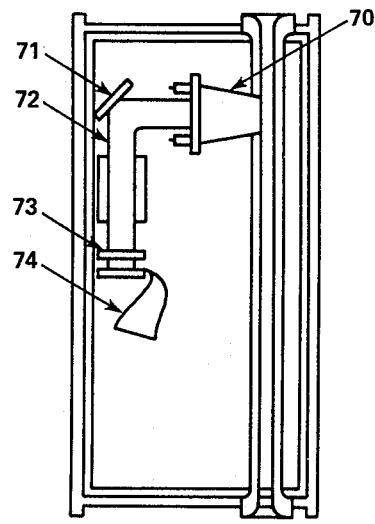
FIG. 7 is a modification of the lens system of FIG. 4 to shorten the system. A corner mirror is placed in the system.

In some instances, where space may be a problem or a smaller unit is desired, the optical path may be deflected as illustrated in FIG. 7. The optical reader will accept the light through the nose section 70, and is deflected through the corner mirror 71 along the tube 72 to the optical array 73. The signals are then transferred to the rest of the circuit through the flexed circuit 74.

Figure 8:
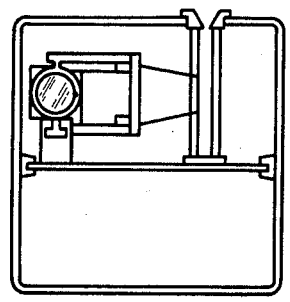
FIG. 8 is a side view of FIG. 7.

FIG. 8 is a side view of the modifications shown in FIG. 7.

Figure 9:
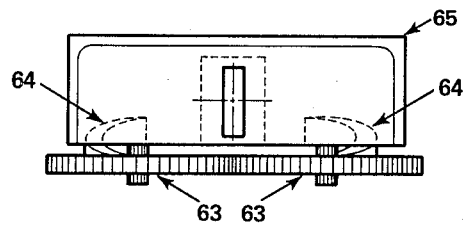
FIG. 9 is an abbreviated illustration of the document track and the adjustment mechanism.

FIG. 9 illustrates the two thumb wheels 63 used to adjust the document track 65 which rides up and down on the helical ramps 64. The turning of one wheel automatically turns the other wheel so that the two ramps move simultaneously to maintain the document track in a horizontal position.

We claim:

1. An apparatus for reading both magnetically and optically comprising track means, an optical reader, a magnetic reader mounted on said track means and secured in a fixed relation thereto, and two interacting thumb wheels for vertical adjustment of said track means, said optical reader mounted adjacent to and independent of said track means, said track means having an aperture therein through which optical reading is accomplished.

2. The apparatus according to claim 1 wherein said track means and aperture therein is adjustable vertically with respect to said optical reader.

3. An apparatus for reading different positional data on a document where the positional data is spaced apart and the data at each position is readable only by one type of reader, comprising: an optical reader, a magnetic stripe reader, and a document track, said magnetic stripe reader being mounted on said document track, said optical scanner being independent of said document track, and adjustment means for adjusting the document track in respect of said optical reader to permit the optical reader to scan data at various locations on the document while the magnetic stripe reader remains in a fixed relationship to the document track and reads the same area each time the document is magnetically read.

4. The apparatus according to claim 3 wherein the document track has an aperture therein which is moved vertically with respect to the optical scanner.

5. The apparatus according to claim 3 wherein the document track is moved vertically by adjusting either one of two interacting thumb wheels.

6. The apparatus according to claim 5 wherein the document track rides on two helical cams attached to said thumb wheels.

* * * * *